United States Patent [19]

Philipps et al.

[11] Patent Number: 5,028,026
[45] Date of Patent: Jul. 2, 1991

[54] SUCTION CUP BRACKETS

[76] Inventors: Joseph F. Philipps, 4706 Maple Lane, North Royalton, Ohio 44133; David J. Philipps, 625 S. Hubbard, Algonquin, Ill. 60102

[21] Appl. No.: 833,111

[22] Filed: Feb. 26, 1986

[51] Int. Cl.$^5$ ............................................. F16B 47/00
[52] U.S. Cl. .............................. 248/206.2; 248/206.1; 248/235; 248/315
[58] Field of Search ............... 248/206.1, 206.2, 206.5, 248/315, 235, 206.3, 205.7

[56] References Cited

U.S. PATENT DOCUMENTS

| 435,752 | 9/1890 | Ingersoll | 292/DIG. 15 X |
| 1,975,303 | 10/1934 | Walker et al. | 248/315 X |
| 2,044,520 | 6/1936 | Weiant, Jr. | 248/206.1 X |
| 2,051,847 | 8/1936 | Halstead | 248/206.4 X |
| 2,131,224 | 9/1938 | Kaack | 248/206.1 |
| 2,309,121 | 1/1943 | Keely | 248/206.1 |
| 2,360,224 | 10/1944 | Hannaford | 248/311.2 X |
| 2,746,767 | 5/1956 | Evans | 248/206.1 X |
| 4,376,521 | 3/1983 | Walters | 248/235 X |

FOREIGN PATENT DOCUMENTS

| 613426 | 8/1926 | France | 248/206.1 |
| 382386 | 11/1964 | Switzerland | 248/205.5 |
| 304491 | 1/1929 | United Kingdom | 248/206.1 |
| 667733 | 3/1952 | United Kingdom | 248/205.5 |
| 840443 | 1/1960 | United Kingdom | 248/205.5 |

Primary Examiner—Karen J. Chotkowski

[57] ABSTRACT

This invention relates to brackets that are held in place on a smooth surface by means of suction cups. More particularly, it relates to formed rod bracket elements that are formed in a manner such that when the invention is in use a portion of the bracket element becomes a fulcrum resting upon the flattened surface of the suction cup at a point generally below the central hub of the suction cup to which hub the bracket element is attached. A variety of bracket elements are contemplated such as for use in supporting potted plants, suspending hanging objects such as hanging plants or ornamental devices, and supporting shelves or small platforms.

8 Claims, 3 Drawing Sheets

SUCTION CUP BRACKETS

BACKGROUND OF THE INVENTION

This invention relates to brackets that are held in place on a smooth surface by means of suction cups. More particularly, it relates to formed rod bracket elements that are formed in a manner such that when the invention is in use a portion of the bracket element becomes a fulcrum resting upon the flattened surface of the suction cup at a point generally below the central hub of the suction cup to which hub the bracket element is attached. A variety of bracket elements are contemplated such as for use in supporting potted plants, vases, candles, and small platforms or shelves, or in suspending hanging articles such as hanging plants or ornamental objects and bird feeding devices.

It has become common practice to use suction cups to support various objects from substantially vertical smooth surfaces. Much of this practice has relied upon simple hooks formed of wire and attached to the hub of the suction cup either by wrapping the wire around the hub, imbedding it in the hub, securing it to the hub with a screw fastener, or by way of insert into a hole penetrating at least part way through the hub. In most of the common practice, the hook or point of attachment for the article being supported is in close proximity to the supporting vertical surface. In such practice, it is extremely awkward to functionally suspend a three-dimensional article whose maximum dimensions as projected on a horizontal plane make free-hanging suspension of the article from such a point of attachment impossible. It is desirable to effect this three-dimensional article suspension and/or support from a support surface employing a suction cup and extended rod support members.

Throughout this disclosure (including the claims related hereto), the term "formed rod" carriers expanded meaning: for the purposes of this disclosure, it is our intent to include within this term articles made by any forming process, whether performed at normal room temperatures or at elevated temperatures and whether the material from which they are made is metal wire, metal, glass, or plastic rods, metal, glass, or plastic tubing, or combinations thereof, including such materials reinforced with particulate, fibrous, or fibroid fillers; in resin- or plastic-containing materials we include articles formed by bending processes performed prior to, as well as after the final curing of the resin within the definition of "formed rod". Thus we also include materials formed by molding processes, such as by injection molding. Similarly, throughout this disclosure (including the claims relating hereto), the word "rod" carries an expanded meaning that includes all of the various materials of construction described in this paragraph and other suitable materials.

It is therefore an object of this invention to provide a formed rod bracket for attachment on a single suction cup by means of an integral loop around the hub of said suction cup with a groove or boss thereon, which bracket comprises an open or closed loop or loop portion capable of supporting a potted plant therein somewhat remote in a horizontal direction from the point of support on the supporting surface, which loop may take a shape that is generally circular or generally polygonal such as square, hexagonal, or octagonal, for examples.

It is a further object of this invention to provide a formed rod bracket for attachment on a single suction cup by means of an integral loop around the hub of said suction cup with a groove or boss thereon, which bracket is capable of supporting, by means of a hook or other rod configuration terminal end, an article such as a plant, a vase, a candle, a shelf, an ornamental object, or a bird feeding device, which article is supported at a location somewhat remote in a horizontal direction from the point of support on the supporting surface, and which bracket is made from a single length of rod and is formed to provide a fulcrum that rests upon the flattened disc of the suction cup to provide additional support and stability for the object supported by the bracket.

It is a further object of this invention to provide a formed rod bracket for attachment on a single suction cup by means of an integral loop around the hub of said suction cup with, a groove or boss thereon, which bracket is capable of supporting, by means of hooks or other rod configuration terminal ends, two or more articles—articles such as plants, vases, candles, shelves, ornamental objects, or bird feeding devices—at two or more different locations, each somewhat remote in a horizontal direction from the point of support on the smooth supporting surface to which the suction cup is attached, which bracket is made of a single length of rod and formed to provide a fulcrum that rests upon the flattened disc of the suction cup to provide additional support and stability for the objects supported by the bracket.

It is a further object of this invention to provide a formed rod bracket for attachment on a single suction cup by means of an integral loop around the hub of said suction cup with a groove or boss thereon, which bracket comprises two open or closed loops or loop portions, each capable of supporting a potted plant therein at a location somewhat remote in a horizontal direction from the point of support on the smooth supporting surface to which the suction cup is attached, which loops may take a shape that is generally circular or generally polygonal such, as square, hexagonal, or octagonal, for examples.

It is a further object of this invention to provide in any of the other objects of this invention the additional feature of the use of rod having at least one flat surface, including rod that has a polygonal cross section (such as triangular, quadrilateral, pentagonal, hexagonal, etc.), for forming at least the stem portions of the formed rod bracket parts thereof, the formed rod suction cup mounting part having a stem portion being a separate part from the formed rod hook, loop, partial loop, shelf support, or other bracket configuration part having a stem portion; and a hollow sleeve device having at least one flat internal surface for cooperative slideable engagement of the stem portions of the two formed rod parts to serve as a coupling for the substantially axial joining of said stem portions to form a non-rotatable, but axially adjustable and detachable bracket assembly.

It is a further object of this invention to provide in any of the other objects of this invention the additional feature of a detachable spring clip that serves as a sway control device to help to hold the hub of the suction cup, and any bracket of this invention attached thereto, substantially perpendicular to the supporting surface. The head of this clip also serves as an internal hub expander to tighten the grip of the hub upon the hub loop of the bracket.

It is a further object of this invention to provide in any of the other objects of this invention the additional feature wherein, when the suction cup is attached to a smooth supporting surface and the bracket is in a no-load condition, the integral loop around the hub is inclined toward the supporting surface such that when the maximum rated load is applied on the bracket said bracket pivots on its fulcrum point and the integral loop around the hub assumes an orientation substantially parallel to said supporting surface, thereby to obtain optimal performance from the suction cup.

DISCUSSION OF PRIOR ART

Various previous patents teach the use of single suction cups to support attachments, even to the extent of including attachments that provide a fulcrum for added support. In most of these cases the fulcrum is positioned to derive its support directly from the supporting surface. Pressure and movement at the fulcrum point could result in scratching or otherwise marring of the supporting surface. Furthermore, smooth supporting surfaces increase the potential for slipping or sliding of the fulcrum portion of the support attachment, permitting the supported article to shift out of position or to fall. Examples of such U.S. patents are: U.S. Pat. No. 2,527,899, issued to O. Valasek; U.S. Pat. No. 1,616,574, issued to W. T. Henry; U.S. Pat. No. 1,146,275, issued to P. P. Pierce; and U.S. Pat. No. 435,752, issued to C. H. Ingersoll. In all of these patents, the fulcrum point is directly on the supporting surface.

A suction cup and fulcrum arrangement wherein the fulcrum is on the surface of the suction cup is taught in U.S. Pat. No. 4,456,210, issued to W. E. McBride, for mounting a transducer, as might be used for sonar depth gauges or fish locators, to the transom of a boat. Contact between the fulcrum arm and the suction cup is made only when the boat is in motion as specifically stated in the patent; furthermore, the patent is in no way related to a formed rod bracket as defined herein.

A suction cup and fulcrum arrangement with the fulcrum on the surface of the suction cup is also taught in U.S. Pat. No. 2,309,121, issued to C. D. Keely, which shows the support used for a receptacle such as a soap dish. In this patent, the fulcrum member is formed of flat members that may be slidably engaged to allow mounting on either a horizontal or a vertical supporting surface; the patent does not pertain to a formed rod bracket as defined herein.

Another suction cup and fulcrum arrangement with the fulcrum on the surface of the suction cup is taught in U.S. Pat. No. 2,131,224, issued to C. Kaack, in which "an auxiliary supporting arm" is described that terminates at one end resting on the suction cup (i.e. the fulcrum) and at the other end in two flexible receiving lips, forming a socketed portion to receive an article to be supported. In this patent, the retaining force of the lever is between the fulcrum and the article to be supported, typical of a class 3 lever. In contrast, the present invention has the fulcrum placed between the retaining force (suction cup attachment) and the article to be supported, which is typical of a class 1 lever. Furthermore, in the present invention the fulcrum is in no way part of an auxiliary arm, rather it is an essential portion of the formed rod bracket.

U.S. Pat. No. 2,044,520, issued to W. S. Weiant Jr., teaches fulcrum arms wherein the free ends of the arms rest in curved depressions formed in "keeper lugs", which are raised portions on the back side of the disc of the suction cup. The article of the Weiant patent relies upon two suction cups for support and these suction cups must be carefully oriented to correctly position the keeper lugs; both of these requirements are clearly absent in the present invention.

Nowhere in the prior art discussed above is any mention or allusion made to a formed rod bracket mounted by means of a single suction cup for the support of an object or objects at a location remote from the supporting surface, nor such a bracket wherein an integral fulcrum support that rests upon the flattened portion of the suction cup is present, which fulcrum acts as a fulcrum in a class 1 lever, such a lever being the type wherein the fulcrum is between the resistance arm and the effort arm.

Prior art further reveals applications of limited specific intent and character, with most designs being made of multiple, complicated, or bulky components. Nowhere in the prior art is any mention or allusion made to an article so simple and so effective as the present invention.

It is thus desirable to provide a suction cup support bracket for suspending, hanging, containing, or otherwise supporting objects at a location somewhat remote in a horizontal direction from the point of support on a smooth supporting surface, which bracket:

1. will realize optimum holding power and engagement life of the suction cup;

2. will not deflect from the horizontal under design loads;

3. will not scratch, mar, or otherwise damage its supporting surface;

4. will not slip or slide on its supporting surface;

5. will not twist;

6. will have versatility to encompass a wide variety of uses including those not practicable with suction cup brackets of prior art, such as for suspending potted plants, candles, or other three-dimensional objects on window glass, glass room dividers, mirrors, and on other smooth support surfaces;

7. will extend opportunities to everyone for enjoyment of living plants in single homes, apartments, or offices by offering a means of positioning plants on readily available windows, mirrors, or other smooth support surfaces where other suitable lighted areas are limited or unavailable;

8. will eliminate the need for conventional bulky or unappealing ceiling or wall brackets and supports, the installation of which incorporates the use of nuts, bolts, screws, glue, tape, or other in-wall or in-ceiling fasteners whose installed location is relatively fixed and whose removal leaves surfaces to be repaired;

9. will provide in a two-piece alternate embodiment a means of either removing an article or changing the type of article supported by substitution of end pieces without removal of the suction cup from its engaged position;

10. will be simple in design, durable in use, inexpensive to purchase, inconspicuous during use, lightweight, and attractive.

DETAILED DESCRIPTION OF THE INVENTION

This invention can best be understood by reference to the accompanying drawings that are presented as FIGS. 1 through 9. The invention comprises a novel bracket for use in mounting objects to a smooth surface by means of a suction cup. A simple embodiment of the invention is presented in FIG. 1. A suction cup 10 consisting of a concave disc 12 and a hub 14 the two parts molded from a rubber or rubberlike material or polymer as one piece and inseparable and the hub, having a means to receive a loop around the hub such as a groove in the outer surface or a boss around the outer surface—said hub may have an axial blind hole 15 (shown in FIG. 6) extending part way through the hub—is fitted with a bracket 16 comprising an integral loop around the hub 18, a descending section 20, a fulcrum point bend at 22, a stem 24, and a loop 26 suitable for holding, for example, a flower pot or a shelf or a tray. It is preferred that the bracket 16 be formed of wire with a circular or rectangular, such as square, cross section. However, it should be obvious to one skilled in the art that other materials may be substituted.

Figures 1, 2, 3, 4:
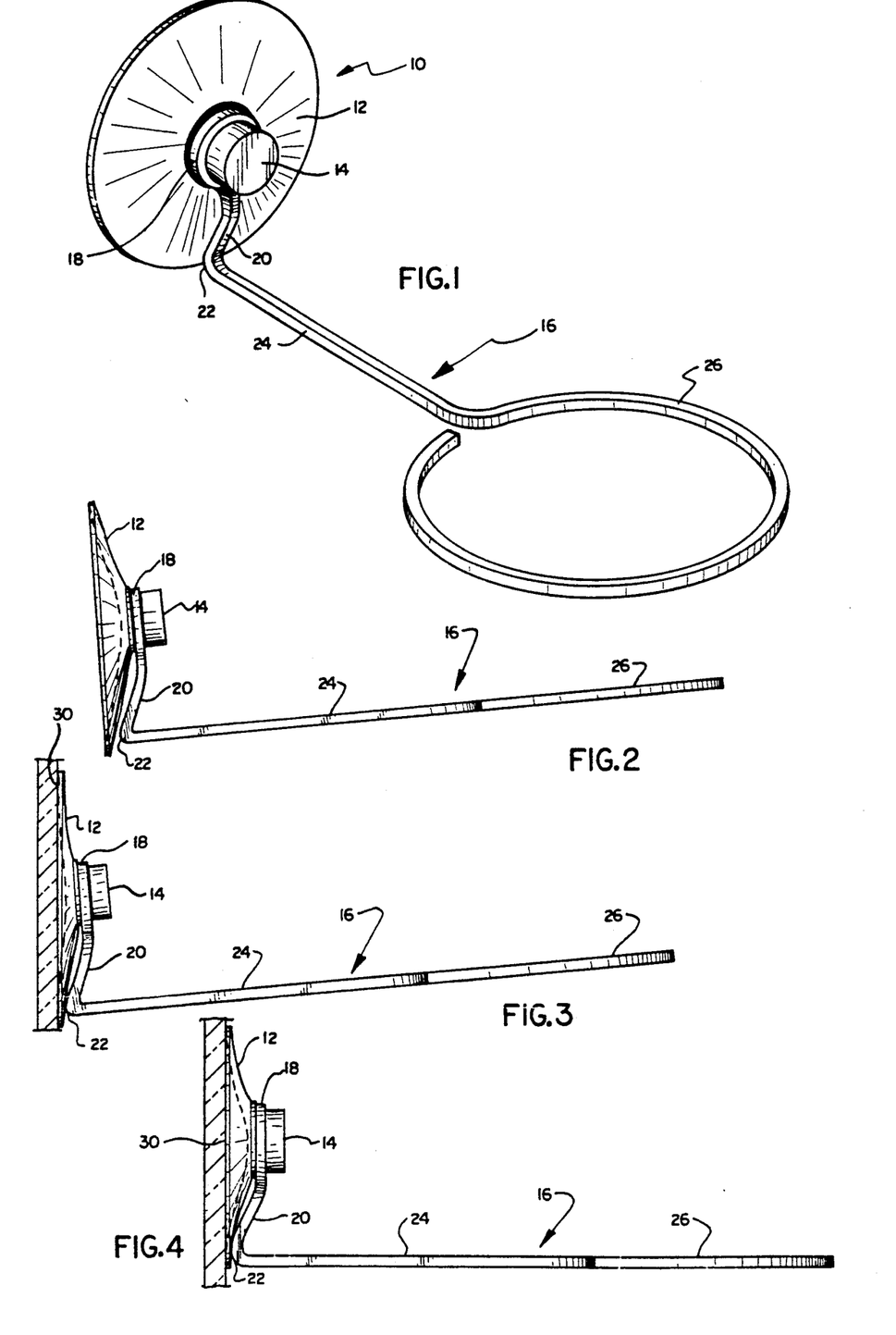
FIG. 1 shows one embodiment of the invention in perspective view.
FIG. 2 illustrates the same embodiment of the invention is side view.
FIG. 3 presents the same embodiment of the invention in side view after it is applied to a smooth surface with no load applied.
FIG. 4 shows the same view as does FIG. 3, but with an applied load.

More details of construction that are especially significant are visible in FIG. 2, which is a side view of FIG. 1. Here the actual shape of the descending section 20 can be seen wherein the bracket is made so the descending section tends toward the outer rim of the disc 12 of the suction cup so that when the suction cup is attached to a surface, as shown in FIG. 3, the aforesaid fulcrum bend makes physical contact with the suction cup disc 12 at 22, a point substantially below the hub. This contact is on the disc and not on the supporting surface, thus the supporting surface is not marred by the fulcrum bend, nor does the fulcrum bend rest on a smooth, hard surface upon which it might slip. The result of said contact being on the disc is a more stable support for the articles supported by the bracket.

It is best that the integral loop around the hub 18 be not parallel to, but rather be inclined at its top toward the surface 30 to which the suction cup is attached. Thus, when the maximum rated load is applied on the loop 26 the bracket pivots on the fulcrum point at 22 and the integral loop around the hub 18 assumes a position substantially parallel to the supporting surface 30 resulting in uniform pressure on the groove or boss of the hub, which uniform pressure results in a force on the hub that is in a direction substantially orthogonal to the supporting surface, resulting in obtaining the optimum performance from the suction cup.

Figures 5, 6, 7, 8:
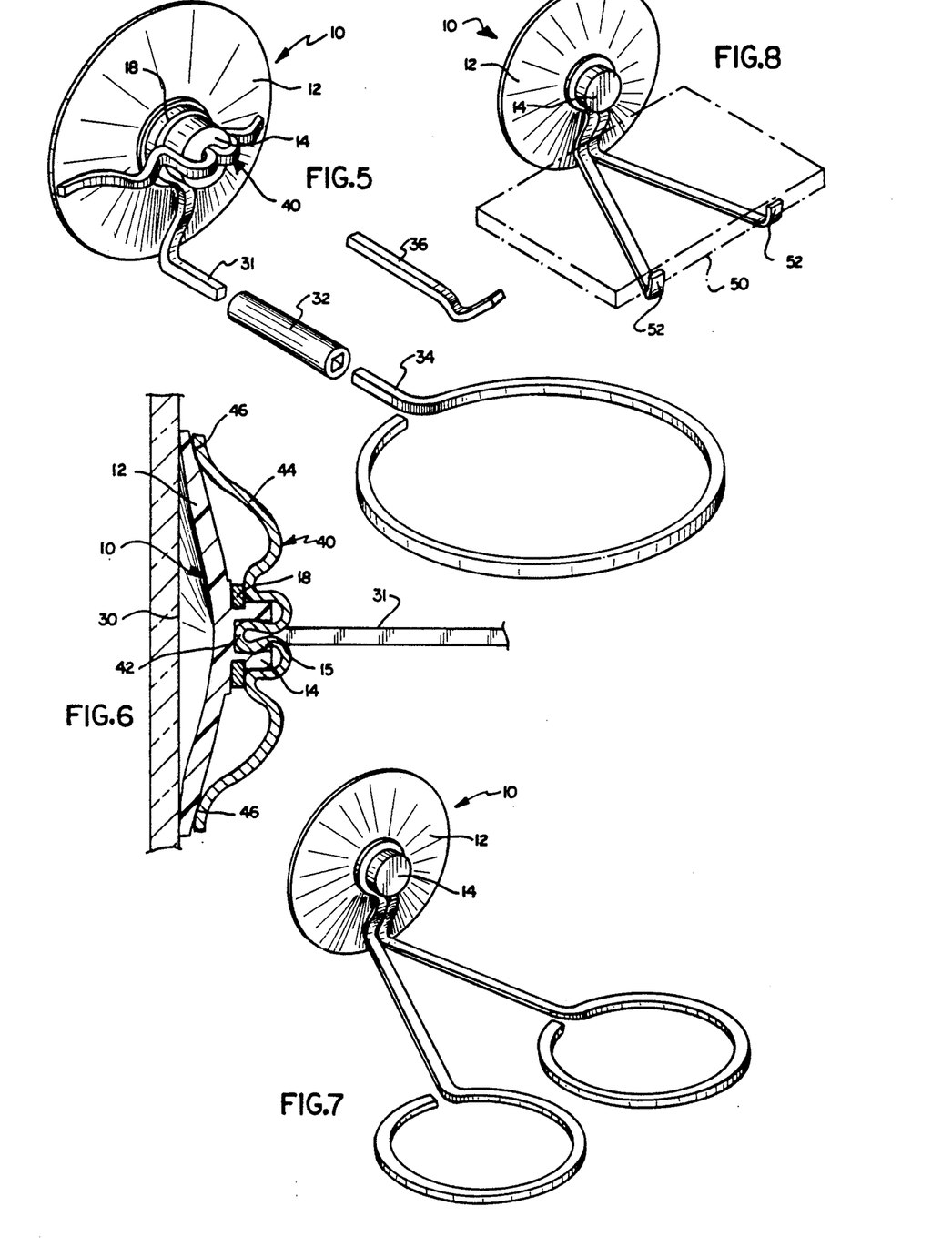
FIG. 5 shows an embodiment of the invention with interchangeable parts to provide for different end uses one of which parts is a hook for suspending hanging objects.
FIG. 6 shows a further feature of the invention in cross section as viewed from the top.
FIG. 7 shows in perspective view another embodiment of the invention, one in which two items may be supported on one suction cup.
FIG. 8 presents an embodiment of the invention in which two stems on a single suction cup support a tray or a shelf.

An embodiment that satisfies several additional needs is illustrated in FIG. 5. An integral loop around the hub 18 has a stem 31 that is slideably engaged axially with one end of a coupling 32 with which one of a variety of end pieces, of which only two are shown 34 and 36, which end pieces may be used interchangeably, is similarly engaged at its opposite end. The bracket shown is formed from wire having a square cross section with a corresponding coupling 32 that has a square hole, which hole may be continuous through the coupling or may be of a limited depth such as less than one-half the length of the coupling. As another alternative, the coupling may be of continuous cross section with a stop means midway therough its length, such as a swaged dimple might provide. In practice, the bracket may be made of material having a circular cross section with the exception of at least that portion of the stem that engages a coupling, which portion will have at least one flat surface to cooperatively and slideably engage a corresponding flat surface within the coupling to prevent rotation of the end piece relative to the stem corresponding to that shown as 31. The use of brackets having cross sections in the shape of polygons, such as triangles, squares, rectangles, pentagons, or hexagons, to cite examples, is also contemplated and each could be used with an appropriate coupling to prevent rotation of the end piece relative to the stem.

The reasons for using this preferred embodiment, shown in FIG. 5, are several. In the mounting of a living plant on a window pane by means of this invention, it is often desirable to remove the plant for watering, soaking, showering, misting, trimming, moving it into or out of direct sunlight, or for other floricultural or horticultural purposes. Removing and reapplying a suction cup reduces its useful lifetime in terms of its holding power; the two-piece stem of FIG. 5 allows for easy removal of the plant and its supporting ring 34 from the bracket without disengaging the suction cup. Similarly, should the bracket be used on a window that is fitted with a blind, a shutter, a curtain, or a shade, the stem 31 will allow closing of the blind, shutter, curtain, or shade after the plant, loop, and coupling are removed; the suction cup, together with the stem attachment 31, remains on the glass undisturbed. If the invention is used for display purposes other than for plants, it will surely be desirable to have the flexibility offered by the interchangeability of the bracket end 34 or 36 of the two-piece stem shown in FIG. 5 to change the display without removing the suction cup for reasons stated above.

It has been previously pointed out that it is particularly important in supporting the maximum rated load that the force on the hub be substantially orthogonal to the supporting surface. The fulcrum, combined with the inclination of the integral loop around the hub, produces this result as viewed in a vertical plane when the bracket is under its maximum rated load. It has been found by experiment that a further improvement in performance in the form of a greater margin of safety, especially at the maximum rated load, can be attained if a means is provided to also stabilize the suction cup-bracket system in a horizontal plane by keeping the hub substantially perpendicular to the supporting surface. Such a means is illustrated in FIG. 5 and also in a top view in cross-section in FIG. 6.

FIG. 6 shows the suction cup disc 12 and hub 14 with an axial hole 15 into which is inserted the head 42 of the anti-sway clip 40, which clip comprises said head 42 and two spring arms 44 that extend in opposite directions in a plane substantially perpendicular to the supporting surface in a generally horizontal plane (when attached to a vertical surface) to contact the rim of the disc 12 of the suction cup 10 at two points 46 that are substantially mutually coplanar with the head 42. The head engages the said hole axially in an interference fit causing the hole in the region of the head and the hub surrounding the hole to distend, thereby to grip more tightly the integral loop around the hub; the elastic nature of the suction cup hub causes it to grip the head of the clip to hold it securely but removably in place. The spring arms cooperate to maintain the axis of the head and therefore the axis of the hub into which it is inserted substantially perpendicular to the supporting surface in the generally horizontal plane (when attached to a vertical surface) of the clip, thereby enabling optimal performance of the suction cup 10. The said clip may also be formed to contact the integral loop around the hub as shown in FIG. 6, thereby to provide a retaining force directly to the integral loop around the hub to maintain it substantially parallel to the supporting surface in the generally horizontal plane (when attached to a vertical surface) of the clip, and thus to further ensure optimal performance of the suction cup. The net result of the use of the anti-sway clip is that forces are resisted that would tend to move the article, and the bracket supporting it, in a horizontal direction and thereby to reduce the effectiveness of the suction cup.

An alternative construction of the anti-sway clip entails the use of a suitable shape, similar to that of the clip shown in FIG. 6, made from flat spring steel with a threaded or non-threaded fastener through it to engage in an interference fit in the axial hole in the suction cup hub. The fastener could be a machine screw or bolt or a non-deformed rivet that would be held in place by friction on the interior walls of said axial hole and perform all of the functions of the aforesaid head of the clip.

The features of this invention are not limited to brackets for the support of a single object or supporting rod from a single suction cup. All of the features previously mentioned can be directly adapted to a bracket that has two stems and two end pieces such as the bracket shown in FIG. 7. The bracket shown in FIG. 7 is made from a single piece of material, but it could also incorporate the two-piece stem feature previously discussed. This two-stemmed embodiment has a descending portion and a fulcrum bend on each end of the integral loop around the hub and each fulcrum point operates exactly as was described above for the single-stem example.

Yet another embodiment of this invention is presented in FIG. 8, wherein a tray or shelf 50 is supported by a two-stemmed bracket 52 in which the stems are splayed, one from the other, starting at or near the fulcrum bend, said splaying offering triangulated support for the shelf. Many uses for a shelf-supporting bracket of this design are immediately obvious.

Figure 9:
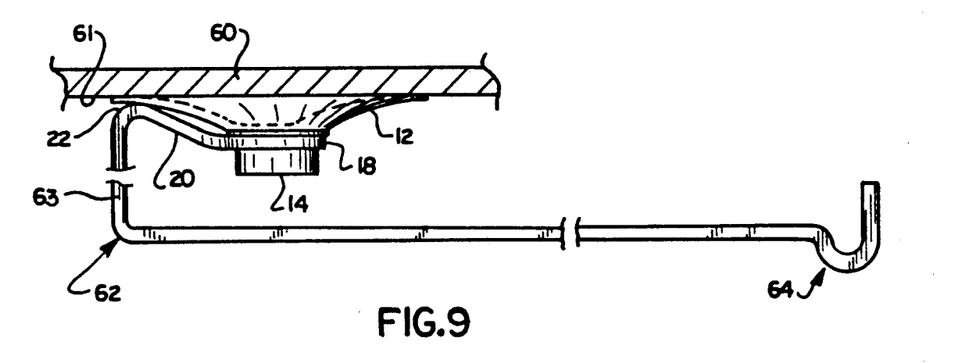
FIG. 9 shows an embodiment of the invention that is specifically designed for attachment under a shelf or a platform.

A final embodiment of this invention, one that is specifically designed for suspending an object or objects on an extended rod from the underside of a substantially horizontal supporting surface such as a shelf or other smooth substantially horizontal surface, is shown in FIG. 9. The figure shows a shelf 60 having a lower surface 61 to which the suction cup 12 is attached. All of the previously described features of the hub 14, integral loop around the hub 18, descender rod portion 20, and fulcrum bend 22 apply, except that now an additional bend of 90 degrees, more or less, is made in the rod as at 62 to provide, at some distance below the supporting surface determined by the length of stem section 63, a substantially horizontal support rod (which provides the principal horizontal displacement of the object supported from the point of support on the supporting surface) extending thence to the end configuration 64. In the horizontal section may be included the features of the two-piece stem configuration of FIG. 5 with one of a multiplicity of bracket end configurations as may be appropriate.

For convenience, the bracket of this invention has been described wherein the principal external forces acting upon the bracket result from gravitational forces upon the bracket and upon the article supported upon or suspended by it. It must be understood that the article of this invention can be useful in other orientations as well, such as for the anchoring of an object that exerts a substantially horizontal force upon the anchoring bracket. The use of the claimed article in other orientations must be considered as being equivalent wherein the vertical direction is equivalent to the direction of the principal force against which the bracket restrains the object applying the force, and the horizontal direction is equivalent to a direction orthogonal to the direction of said principal force.

THE BEST MODE OF THE INVENTION

The best mode of the invention has the following features:

a. the suction cup has a hub with an axial hole and a continuous exterior groove or a boss as described elsewhere;

b. the material used to form the entire bracket is wire of square cross section;

c. the suction cup mounting part, comprising the integral loop around the hub, the descending portion, the fulcrum bend, and a stem, is a separate part from the hook, loop, partial loop, shelf support, or other functional end-piece part, which part also has a stem, and the two parts are made to be axially, detachably, adjustably, and non-rotatably joined for use by means of a hollow sleeve coupling device to form a bracket assembly;

d. a detachable spring clip sway control device, the enlarged head of which is inserted into the axial hole in the suction cup hub, which device contacts the integral loop around the hub and terminates at its two ends in substantial contact with the suction cup disc to serve as an anti-sway and hub loop tightening and retaining device;

e. the integral loop around the hub is inclined at its top toward the supporting surface when the bracket is in an engaged, but non-loaded condition and the bracket pivots on its fulcrum point when under load so that the integral loop around the hub becomes parallel to the supporting surface at the maximum rated load.

Now, having presented description and specific examples, including the best mode, of our invention by way of explanation so one skilled in this art will have no difficulty in reproducing our invention to achieve results similar to ours, it should be understood that the invention has greater breadth than one can delineate in a few specific examples.

We claim:

1. A bracket assembly comprising a one-piece formed rod bracket in combination with a single suction cup, said suction cup comprising a disk portion that adheres to a smooth flat surface by suction means and a hub portion that is substantially cylindrical and which extends outwardly from the center of said disk portion and which hub portion comprises a retaining means such as a groove or an integral boss encircling said hub portion, said bracket comprising a rod having an integral hub loop portion placed around the hub portion of said suction cup cooperatively engaging said retaining means, firmly attaching but allowing for separation of the said bracket and the said suction cup, the said integral hub loop portion of the said rod of the bracket is inclined at its top toward the surface to which the suction cup is attached; the bracket also comprises a stem portion extending from the rod of the bracket; the bracket comprises a functional rod configuration terminal end extending from the rod of the bracket, which rod configuration terminal end is capable of holding or retaining an object at a location remote in a horizontal direction from a point of support to which the suction cup is attached, which bracket also comprises a fulcrum bend portion extending from the rod of the bracket, wherein the fulcrum bend portion rests upon the flattened disk portion of the suction cup when the bracket assembly is in a no-load condition and presses against the said flattened disk portion of the said suction cup when an object is placed on the rod configuration terminal end of the bracket to provide additional essential support and stability for the object supported by the bracket, wherein the said bracket acts as a class 1 lever pivoting on the said fulcrum bend portion, the integral hub loop portion of the rod of the bracket exerting an outward pull on the hub portion of the suction cup causing deformation of the suction cup to allow the integral hub loop portion of the rod of the said bracket to assume an orientation substantially parallel to the surface to which the suction cup is attached when the maximum design load is employed on the rod configuration terminal end of the said bracket, effecting uniformly distributed horizontal pressure on the hub portion of the suction cup to achieve the optimum performance from the said suction cup.

2. A bracket assembly comprising a one-piece formed rod bracket in combination with a single suction cup, said suction cup comprising a disk portion that adheres to a smooth flat surface by suction means and a hub portion that is substantially cylindrical and which extends outwardly from the center of said disk portion and which hub portion comprises a retaining means such as a groove or an integral boss encircling said hub portion, said bracket comprising a rod having an integral hub loop portion placed around the hub portion of said suction cup cooperatively engaging said retaining means, firmly attaching but allowing for separation of the said bracket and the said suction cup, the said integral hub loop portion of the said rod of the bracket is inclined at its top toward the surface to which the suction cup is attached; the bracket also comprises two stem portions extending from the rod of the bracket, which stem portions are splayed one from the other starting substantially at a point on the surface of the disk portion of the suction cup below the hub portion of said suction cup, which point is also a point of contact of the rod of the bracket with the said disk portion of the suction cup; the bracket comprises two functional rod configuration terminal ends, each of said terminal ends extending from the rod of the bracket on its own separate stem portion of the bracket, which rod configuration terminal ends are independently and jointly capable of holding or retaining an object at a location remote in a horizontal direction from a point of support to which the suction cup is attached, which bracket also comprises two fulcrum bend portion extending from the rod of the bracket wherein each of the said fulcrum bend portions independently rests upon the flattened disk portion of the suction cup when the bracket assembly is in a no-load condition and press against the said flattened disk portion of the said suction cup when an object is placed on the rod configuration terminal ends of the bracket to provide additional essential support and stability for the object supported by the bracket, wherein the said bracket acts as a class 1 lever pivoting on said fulcrum bend portions, the integral hub loop portion of the rod of the bracket exerting an outward pull on the hub portion of the suction cup causing deformation of the suction cup to allow the integral hub loop portion of the rod of said bracket to assume an orientation substantially parallel to the surface to which the suction cup is attached when the maximum design load is employed on the rod configuration terminal ends of the said bracket, effecting uniformly distributed horizontal pressure on the hub portion of the suction cup to achieve the optimum performance from the said suction cup.

3. A bracket assembly comprising a two-piece formed rod bracket and a hollow sleeve device coupling in combination with a single suction cup, said suction cup comprising a disk portion that adheres to a smooth flat surface by suction means and a hub portion that is substantially cylindrical and which extends outwardly from the center of said disk portion and which hub portion comprises a retaining means such as a groove or an integral boss encircling said hub portion, said bracket comprising a first and a second piece of rod with each piece independent of the other and having a polygonal cross section, said first piece of rod having an integral hub loop portion placed around the hub portion of said suction cup cooperatively engaging said retaining means, firmly attaching but allowing for separation of the first piece of rod of the bracket and the said suctioon cup, the said integral hub loop portion of the said first piece of rod of the bracket is inclined at its top toward the surface to which the suction cup is attached; the bracket also comprises a first stem portion extending from the first piece of the rod of the bracket the bracket also comprises a second stem portion extending from the second piece of the rod of the bracket; the bracket assembly comprises a hollow sleeve device coupling for cooperative slidable engagement and disengagment of the first and second stem portions of the bracket for the substantially axial joining of the said first and second stem portions to form a coupled two-piece bracket which is non-rotatable but axially detachable; the bracket comprises a functional rod configuration terminal end extending from the second piece of the rod of the bracket, which rod configuration terminal end is capable of holding or retaining an object at a location remote in a horizontal direction from a point of support to which the suction cup is attached, which bracket also comprises a fulcrum bend portion extending from the first piece of the rod of the bracket, wherein the fulcrum bend portion rests upon the flattened disk portion of the suction cup when the bracket assembly is in a no-load condition and presses against the said flattened disk portion of the suction cup when an object is placed on the rod configuration terminal end of the bracket to provide additional essential support and stability for the object supported by the bracket coupled by the hollow sleeve device of the bracket assembly, wherein the said bracket coupled by the said hollow sleeve device acts as a class 1 lever pivoting on the said fulcrum bend portions, the integral hub loop portion of the first piece of the rod of the bracket exerting an outward pull on the hub portion of the suction cup causing deformation of the said suction cup to allow the integral hub loop portion of the said first piece of the rod of the bracket to assume an orientation substantially parallel to the surface to which the suction cup is attached when the maximum design load is employed on the rod configuration terminal end of the said bracket effecting uniformly distributed horizontal pressure on the hub portion of the suction cup to achieve the optimum performance from the said suction cup.

4. A bracket assembly comprising a three piece formed rod bracket and two hollow sleeve device couplings in combination with a single suction cup, said suction cup comprising a disk portion that adheres to a smooth flat surface by suction means and a hub portion that is substantially cylindrical and which extends outwardly from the center of said disk portion and which hub portion comprises a retaining means such as a groove or an integral boss encircling said hub portion, said bracket comprising a first and two second pieces of rod with each piece of said rod independent of the others and having a polygonal cross section, said first piece of rod having an integral hub loop portion placed around the hub portion of said suction cup cooperatively engaging said retaining means, firmly attaching but allowing for separation of the said bracket and the said suction cup, the said integral hub loop portion of the said first piece of rod is inclined at its top toward the surface to which the suction cup is attached; the bracket also comprises two first stem portions extending from the first piece of the rod of the bracket, which stem portions are splayed one from the other starting substantially at a point on the surface of the disk portion of the suction cup below the hub portion of said suction cup, which point is also a point of contact of the first piece of the rod of the bracket with the said disk portion of the suction cup; the bracket also comprises two second stem portions extending from the second pieces of the rod of the bracket; the bracket assembly comprises two hollow sleeve device couplings for cooperative slidable engagement and disengagement of the two first stem and the two second stem portions of the bracket for the substantially axial joining of the said two first and two second stem portions of the bracket, one of said hollow sleeve device couplings for each of the first and second stem portions to be joined, to form a coupled three piece bracket which is non-rotatable but axially detachable; the bracket comprises two functional rod configuration terminal ends, one of said rod configuration terminal ends extending from each of the second pieces of the rod of the bracket, which rod configuration terminal ends are independently and jointly capable of holding or retaining an object at a location remote in a horizontal direction from a point of support to which the suction cup is attached, which bracket also comprises two fulcrum bend portions extending from the first piece of the rod of the bracket wherein each of the said fulcrum bend portions independently rests upon the flattened disk portion of the suction cup when the bracket assembly is in a no-load condition and presses the said flattened disk portion of the suction cup when an object is placed on the rod configuration terminal ends of the bracket to provide additional essential support and stability for the object supported by the bracket coupled by the hollow sleeve devices of the bracket assembly, wherein the said bracket coupled by the said hollow sleeve devices acts as a class 1 lever pivoting on the said fulcrum bend portions, the integral hub loop portion of the first piece of the rod of the bracket exerting an outward pull on the hub portion of the suction cup causing deformation of the said suction cup to allow the integral hub loop portion of the rod of said bracket to assume an orientation substantially parallel to the surface to which the suction cup is attached when the maximum design load is employed on the rod configuration terminal ends of the said bracket, effecting uniformly distributed horizontal pressure on the hub portion of the suction cup to achieve the optimum performance from the said suction cup.

5. A bracket assembly comprising a one-piece formed rod bracket and a detachable spring clip in combination with a single suction cup, said suction cup comprising a disk portion that adheres to a smooth flat surface by suction means and a hub portion that is substantially cylindrical and which extends outwardly from the center of said disk portion and which hub portion comprises an axial hole and a retaining means such as a groove or an integral boss encircling said hub portion, said bracket comprising a rod having an integral hub loop portion placed around the hub portion of said suction cup cooperatively engaging said retaining means, firmly attaching but allowing for separation of the said bracket and the said suction cup; the bracket also comprises a stem portion extending from the rod of the bracket; the bracket comprises a functional rod configuration terminal end extending from the rod of the bracket, which rod configuration terminal end is capable of holding or retaining an object at a location remote in a horizontal direction from a point of support to which the suction cup is attached, which bracket also comprises a fulcrum bend portion extending from the rod of the bracket, wherein the fulcrum bend portion rests upon the flattened disk portion of the suction cup to provide additional essential support and stability for the object supported by the bracket; the bracket assembly comprises a detachable spring clip that serves as a sway control device to help hold the hub of the suction cup and therefore any bracket attached thereto substantially perpendicular to the supporting surface, wherein the spring clip comprises a head portion, a shank portion which is received by the axial hole of the suction cup, and two arm portions attached to the end of said shank portion opposite that of the head portion, said arm portions contacting the disk portion of the suction cup, and which head portion is larger than the shank portion and larger than the axial hole in the hub of the suction cup so that, as the head is inserted into said hole in an interference fit, said head causes said hub to distend to accommodate the head, the elastic nature of the hub tends to return the hub to substantially an undistorted size and shape, thereby to more effectively grip the head of said clip, and said distention causes the outer surface of the hub to more effectively grip the integral hub loop portion of the rod of the bracket around the said hub of the suction cup.

6. A bracket assembly comprising a one-piece formed rod bracket and a detachable spring clip in combination with a single suction cup, said suction cup comprising a disk portion that adheres to a smooth flat surface by suction means and a hub portion that is substantially cylindrical and which extends outwardly from the center of said disk portion and which hub portion comprises an axial hole and a retaining means such as a groove or an integral boss encircling said hub portion, said bracket comprising a rod having an integral hub loop portion placed around the hub portion of said suction cup cooperatively engaging said retaining means, firmly attaching but allowing for separation of the said bracket and the said suction cup; the bracket also comprises two stem portions extending from the rod of the bracket, which stem portions are splayed one from the other starting substantially at a point on the surface of the disk portion of the suction cup below the hub portion of said suction cup, which point is also a point of contact of the rod of the bracket with the said disk portion of the suction cup; the bracket comprises two functional rod configuration terminal ends, each of said terminal ends extending from the rod of the bracket on its own separate stem portion of the bracket, which rod configuration terminal ends are independently and jointly capable of holding or retaining an object at a location remote in a horizontal direction from a point of support to which the suction cup is attached, which bracket bracket also comprises two fulcrum bend portions extending from the rod of the bracket wherein each of the said fulcrum bend portions independently rests upon the flattened disk portion of the suction cup to provide additional essential support and stability for the object supported by the bracket; the bracket assembly comprises a detachable spring clip that serves as a sway control device to help hold the hub of the the suction cup and therefore any bracket attached thereto substantially perpendicular to the supporting surface, wherein the spring clip comprises a head portion, a shank portion which is received by the axial hole of the suction cup, and two arm portions attached to the end of said shank portion opposite that of the head portion, said arm portions contacting the disk portion of the suction cup, and which head portion is larger than the shank portion and larger than the axial hole in the hub of the suction cup so that, as the head is inserted into said hole in an interference fit, said head causes said hub to distend to accommodate the head, the elastic nature of the hub tends to return the hub to substantially an undistorted size and shape, thereby to more effectively grip the head of said clip, and said distention causes the outer surface of the hub to more effectively grip the integral hub loop portion of the rod of the bracket around the said hub of the suction cup.

7. A bracket assembly comprising a two-piece formed rod bracket, a hollow sleeve device coupling, and a detachable spring clip in combination with a single suction cup, said suction cup comprising a disk portion that adheres to a smooth flat surface by suction means and a hub portion that is substantially cylindrical and which extends outwardly from the center of said disk portion and which hub portion comprises a retaining means such as a groove or an integral boss encircling said hub portion and an axial hole, said bracket comprising a first and a second piece of rod with each piece independent of the others and having a polygonal cross section, said first piece of rod having an integral hub loop portion placed around the hub portion of said suction cup cooperatively engaging said retaining means, firmly attaching but allowing for separation of the said first piece of rod of the bracket and the said suction cup; the bracket also comprises a first stem portion extending from the first piece of the rod of the bracket, the bracket also comprises a second stem portion extending from the second piece of the rod of the bracket; the bracket assembly comprises a hollow sleeve device coupling for cooperative slidable engagement and disengagement of the first and second stem portions of the bracket for the substantially axial joining of the said first and second stem portions to form a coupled two-piece bracket which is non-rotatable but axially detachable; the bracket comprises a functional rod configuration terminal end extending from the second piece of the rod of the bracket, which rod configuration terminal end is capable of holding or retaining an object at a location remote in a horizontal direction from a point of support to which the suction cup is attached, which bracket also comprises a fulcrum bend portion extending from the first piece of the rod of the bracket, wherein the fulcrum bend rests upon the flattened disk portion of the suction cup to provide additional essential support and stability for the object supported by the bracket coupled by the hollow sleeve device; the bracket assembly comprises a detachable spring clip that serves as a sway control device to help hold the hub of the suction cup and therefore any bracket attached thereto substantially perpendicular to the supporting surface, wherein the spring clip comprises a head portion, a shank portion which is received by the axial hole of the suction cup, and two arm portions attached to the end of said shank portion opposite that of the head portion, said arm portions contacting the disk portion of the suction cup, and which head portion is larger than the shank portion and larger than the axial hole in the hub of the suction cup so that, as the head is inserted into said hole in an interference fit, said head causes said hub to distend to accommodate the head, the elastic nature of the hub tends to return the hub to substantially an undistorted size and shape, thereby to more effectively grip the head of said clip, and said distention causes the outer surface of the hub to more effectively grip the integral hub loop portion of the first piece of the rod of the bracket around the said hub of the suction cup.

8. A bracket assembly comprising a three piece formed rod bracket, two hollow sleeve device couplings, and a detachable spring clip in combination with a single suction cup, said suction cup comprising a disk portion that adheres to a smooth flat surface by suction means and a hub portion that is substantially cylindrical and which extends outwardly from the center of said disk portion and which hub portion comprises a retaining means such as a groove or an integral boss encircling said hub portion and an axial hole, said bracket comprising a first and two second pieces of rod with each piece of said rod independent of the others and having a polygonal cross section, said first piece of rod having an integral hub loop portion placed around the hub portion of said suction cup cooperatively engaging said retaining means, firmly attaching but allowing for separation of the said first piece of rod of the bracket and the said suction cup; the bracket also comprises two stem portions extending from the first piece of the rod of the bracket, which stem portions are splayed one from the other starting substantially at a point on the surface of the disk portion of the suction cup below the hub portion of said suction cup, which point is also a point of contact of the first piece of the rod of the bracket with the said disk portion of the suction cup; the bracket also comprises two second stem portions extending from the second pieces of the rod of the bracket; the bracket assembly comprises two hollow sleeve device couplings for cooperative slidable engagement and disengagement of the two first stem and the two second stem portions of the bracket for the substantially axial joining of the the said two first and two second stem portions of the bracket, one of said hollow sleeve device coupling for each of the first and second stem portions to be joined, to form a coupled three piece bracket which is non-rotatable but axially detachable; the bracket comprises two functional rod configuration terminal ends one of said rod configuration terminal ends extending from each of the second pieces of the rod of the bracket, which rod configuration terminal ends are independently and jointly capable of holding or retaining an object at a location remote in a horizontal direction from a point of support to which the suction cup is attached, which bracket also comprises two fulcrum bend portions extending from the first piece of the rod of the bracket wherein each of the said fulcrum bend portions independently rests upon the flattened disk portion of the suction cup to provide additional essential support and stability for the object supported by the bracket coupled by the hollow sleeve devices of the bracket assembly; the bracket assembly comprises a detachable spring clip that serves as a sway control device to help hold the hub of the suction cup and therefore any bracket attached thereto substantially perpendicular to the to the supporting surface, wherein the spring clip comprises a head portion, a shank portion which is received by the axial hole of the suction cup, and two arm portions attached to the end of said shank portion opposite that of the head portion, said arm portions contacting the disk portion of the suction cup, and which head portion is larger than the shank portion and larger than the axial hole in the hub of the suction cup so that, as the head is inserted into said hole in an interference fit, said head causes said hub to distend to accommodate the head, the elastic nature of the hub tends to return the hub to substantially an undistorted size and shape, thereby to more effectively grip the head of said clip, and said distention causes the outer surface of the hub to more effectively grip the integral hub loop portion of the first piece of the rod of the bracket around the said hub of the suction cup.

* * * * *